Patented Nov. 3, 1942

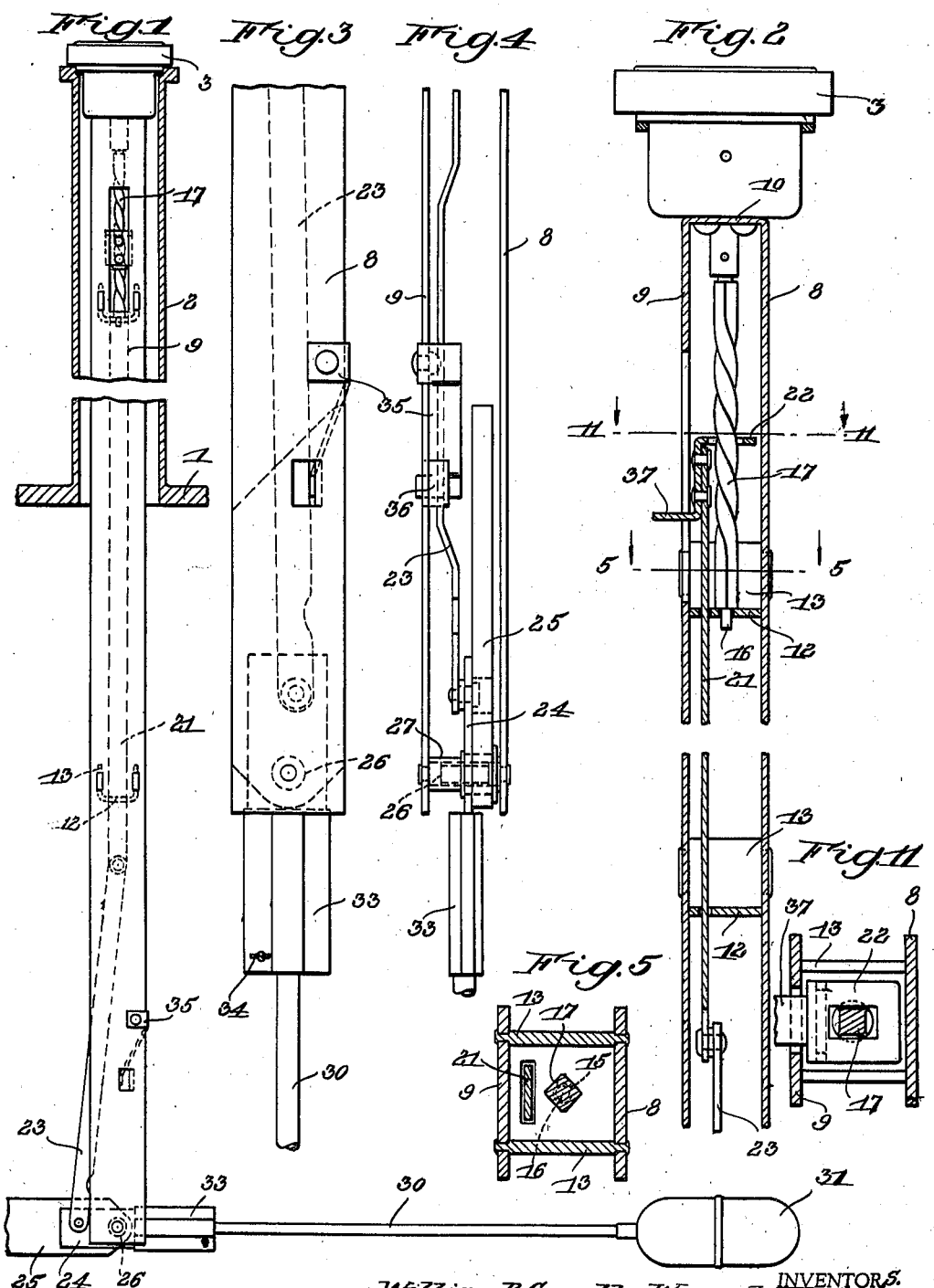

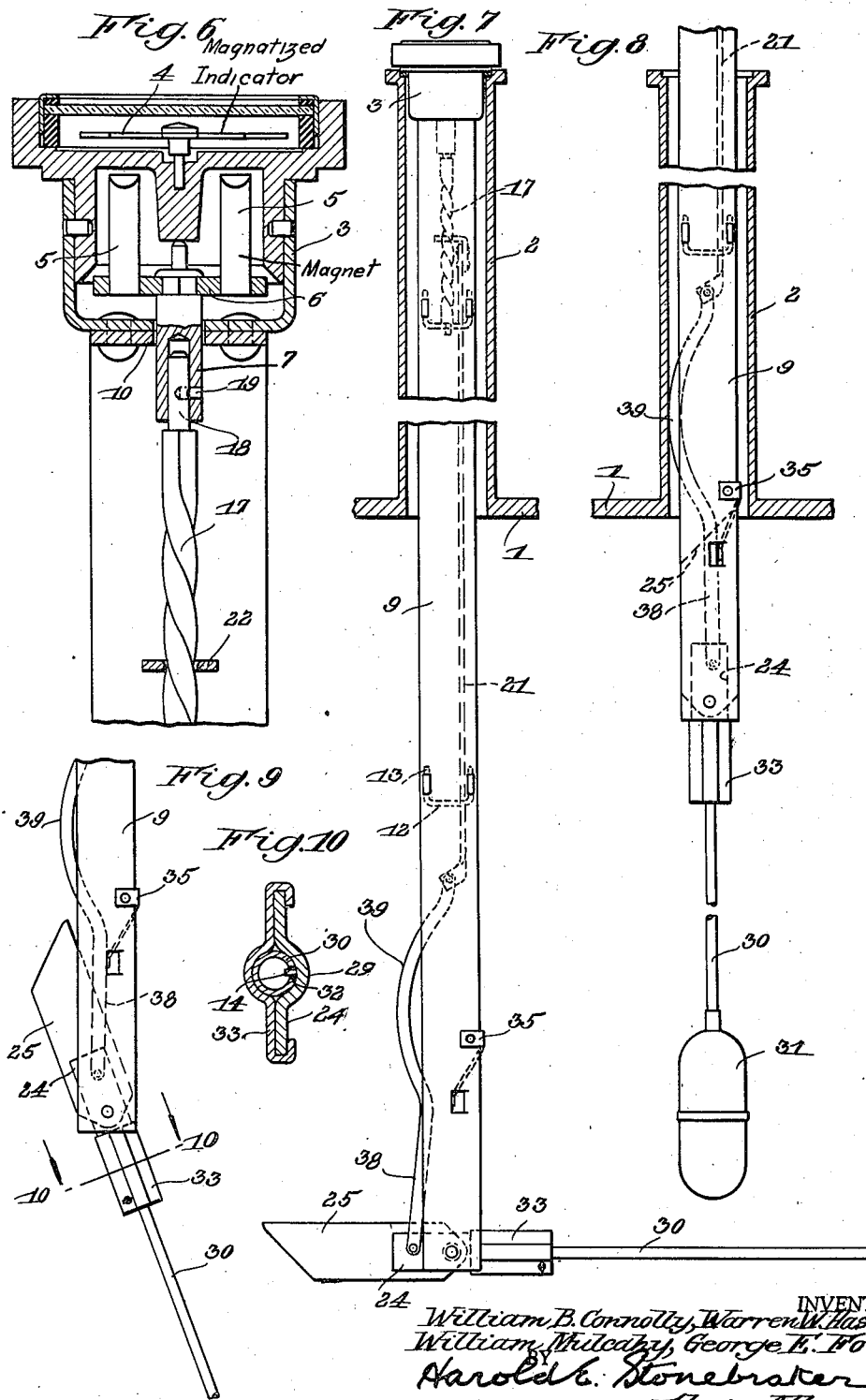

2,300,614

UNITED STATES PATENT OFFICE 2,300,614

LIQUID LEVEL GAUGE

William B. Connolly, Warren W. Hastings, William Mulcahy, and George E. Ford, Rochester, N. Y., assignors to Rochester Manufacturing Co., Inc., Rochester, N. Y., a corporation of New York Application February 5, 1941, Serial No. 377,454

18 Claims. (Cl. 73—317)

This invention relates to certain improvements in a liquid level gauge, with more particular reference to the general type of construction employed in tanks containing butane, propane, or other liquified gas, and has for one of its objects to afford a practical, light-weight construction that is strong, rugged and durable, and built so that the movable parts will withstand the shocks and strains usually imposed on such a mechanism during shipment of the tank in which the gauge is located prior to the installation and use of the tank and gauge.

Another purpose of the invention is to afford a gauge which eliminates toothed gears and segments and in which the indicator is actuated from a rotatable spiral driven member connected to the magnet frame of an indicator in a manner that facilitates calibration of the instrument, in conjunction with a float controlled operating mechanism so constructed and arranged that a relatively short spiral driven member of minimum length may be used, while obtaining the necessary movement to indicate the positions of the float between its extreme "empty" and "full" positions.

Liquid level gauges of this character are used with tanks buried beneath the surface of the ground, the indicator operating mechanism extending through a standpipe into a tank where the float carrier is located, thus requiring units of different lengths depending upon the height of the standpipe, and it is a further object of the invention to afford a structure in which the operating mechanism lends itself readily to being incorporated in a structure and supporting frame of any desired length by varying the length of a slidable actuator, but without requiring any change in the other operating mechanism or the indicator dial.

Another object of the invention is to afford operating mechanism, and a supporting frame therefor, which occupies a minimum cross-sectional area and is therefore adapted to standpipes of small diameters, and in which the float and float carrier can be swung into alinement with the supporting frame so as to facilitate insertion into or removal from a standpipe, together with means acting automatically to move the float carrier and float away from said position of alinement and restore it to operative relationship after it is within the tank.

Still a further purpose of the invention is to provide means for automatically or manually moving the float carrier and float into alinement with the supporting frame when removing the unit from a tank for servicing or repair.

An additional object of the invention is to afford a simple and practical construction for securing a float and counterbalance to a pivoted carrier in a manner that affords a secure, light-weight and strong support for the float rod, and enables the float carrier and counterbalance to be moved into alinement with the supporting frame and confined within the edges of said frame when inserting a unit into a tank or removing it therefrom.

Still another purpose of the invention is to provide a strong, rigid and light-weight supporting frame including spaced parallel side plates secured together by spacing members that function both to tie the side plates securely to form a unitary frame and also to guide a slidable actuator which has a reciprocating motion between the side plates to effect the necessary movement of the spiral driven member.

To these and other ends, the invention consists in the construction and arrangement of parts that will appear clearly from the following description when read in conjunction with the accompanying drawings, the novel features being pointed out in the claims following the specification.

In the drawings:

Fig. 1 is a view in side elevation showing a preferred embodiment of the invention as applied to the standpipe of a tank with the float carrier and float appearing in horizontal position intermediate the limits of movement, the standpipe and tank appearing in section and being partially broken away;

Fig. 2 is an enlarged vertical sectional view taken centrally of Fig. 1, with the lower portion broken away;

Fig. 3 is an enlarged side elevation similar to Fig. 1, partially broken away, showing the float carrier and counterweight in alinement with the supporting frame in the position assumed when being inserted into or removed from a tank through a standpipe;

Fig. 4 is a view in side elevation of the parts illustrated in Fig. 3;

Fig. 5 is a horizontal sectional view on the line 5—5 of Fig. 2 looking in the direction indicated;

Fig. 6 is an enlarged vertical sectional view taken centrally through the indicator head and the spiral driven member;

Fig. 7 is a view similar to Fig. 1, illustrating a modification of the operating mechanism, with means for automatically moving the float carrier and counterweight to a position in alinement with the supporting frame when removing the unit from a tank;

Fig. 8 is a similar view showing the position of the parts appearing in Fig. 7 when being removed through the standpipe;

Fig. 9 is an enlarged detail view in side elevation of the float carrier, float rod, and supporting frame, the float being in its lowest operating position, with parts broken away;

Fig. 10 is a detail sectional view on the line 10—10 of Fig. 9, and

Fig. 11 is a detail sectional view on the line 11—11 of Fig. 2.

Referring more particularly to the drawings in which like reference numerals refer to the same parts throughout the several views, 1 designates the top wall of a conventional tank for containing butane, propane, other liquified gas, or any fluid, see Fig. 1, and 2 is the usual standpipe that receives the liquid level gauge, the latter including at the top thereof an indicator head 3 within which is arranged a magnetized indicator 4. Movement of the indicator 4 is controlled by magnets 5 mounted upon the magnet carrier 6 which is attached to an arbor 7, see Fig. 6. The arbor 7 is connected to and operated by a driven member, actuated by the float carrier through suitable connecting mechanism, and supported in the manner that will now be described.

The supporting frame includes spaced parallel narrow side plates 8 and 9 connected by an upper end portion 10 which is attached to the head 3, as shown in Fig. 6, thus affording a rigid connection between the supporting frame and the indicator head. The side plates 8 and 9 of the supporting frame are held in spaced relation and rigidly fastened together by means of suitable spacing and fastening members, each preferably in the form of a U-shaped plate including a horizontal wall 12 and vertical walls 13 lying between and abutting the side plates 8 and 9. The vertical walls 13 include reduced portions extending through openings in the side plates and are suitably swaged over the outer adjacent surfaces of the side plates in order to hold the U-shaped members permanently in fixed relation thereto and to impart rigidity to the frame.

The uppermost of said U-shaped spacing and fastening members has an opening 15 provided in its horizontal wall 12, see Fig. 5, affording a bearing for the lower end 16 of the driven member, which in the present instance is in the form of a spiral 17, the upper reduced end 18 of which is secured in an opening in the aforementioned arbor 7 by a suitable pin 19. In this manner, to calibrate, the float carrier is placed in a definite position as, for instance, that which it occupies when the tank is half full, and the spiral member moves correspondingly. The arbor 7 and magnet carrier 6 are then manually moved until the magnetized indicator is at the correct position on the scale, and the attaching pin 19 is then set, a hole having been previously drilled to receive the pin 19. The driven spiral member is thus attached to the arbor of the magnet carrier to facilitate calibration of the instrument.

The spiral driven member 17 is relatively short, and is rotated by a slidable actuator, preferably in the form of a relatively long reciprocatory bar 21 that is guided vertically by openings in the horizontal portions 12 of the spacing members, and at its upper end carries arms 22 which embrace the spiral 17 on opposite sides, as shown in Figs. 2 and 6, thus causing the spiral member 17 to rotate when the slidable actuator 21 is moved endwise. The slidable actuator 21 is pivotally associated at its lower end with a connecting rod 23 which in turn is pivotally connected to a float carrier, the latter preferably comprising a plate 24 that has mounted thereon a thin, narrow, elongated counterweight 25, and is pivoted upon a suitable bearing 26 extending between and securing together the lower ends of the side plates 8 and 9 of the supporting frame. This arrangement permits manufacturing the unit in any desired length, by varying the length of the slidable actuator 21, without having to change the connecting rod or other moving parts, since the same float movement gives the same movement of the spiral driven member, irrespective of the length of the slidable actuator.

27 designates a hub carrying the plate 24 and counterweight 25 which are fixed thereto, see Fig. 4, said hub with the plate 24 and counterweight turning on the bearing 26 which is supported between the side plates 8 and 9. Thus the pivoted carrier plate 24 and counterweight 25 swing as a unit about the supporting bearing 26 and effect reciprocatory movement of the slidable actuator or bar 21.

The employment of the carrier plate 24 and the thin elongated counterweight 25 enables swinging the parts into alinement with the central axis of the supporting frame and within the limits of the side edges of the plates 8 and 9, as shown in Fig. 3, to enable inserting the unit into or removing it from a tank through the usual standpipe, and in order to attach the float rod rigidly and securely to the plate 24, the latter is provided with a central longitudinally extending recessed portion or seat 29 to receive the cylindrical float rod 30 carrying the usual float 31 that is adapted to rest upon the surface of the liquid in the tank.

The float rod may be interlocked in the seat 29 of the carrier in any preferred manner, as by a projection 14 on one of the parts engaging a cooperating opening 32 in the other part, and the float rod is held in fixed relation to the plate 24 by means of a slidable clip 33 that is formed to engage one side of the float rod and to embrace the opposite edges of the plate 24, see Fig. 10, so that when slid upon the plate 24 in the manner indicated, the float rod is held securely in position upon the carrier. The retaining clip 33 may be held in place in any suitable manner as by means of a cotter pin 34 or other instrumentality extending through cooperating openings in the clip 33 and plate 24, see Figs. 1 and 3. This affords a practical and efficient means for securing the float rod to a carrier and counterweight assembly, constructed and arranged to occupy a minimum of cross-sectional area and to permit positioning the float carrier and counterweight within the edges of the frame and in alinement therewith.

When the structure is inserted through the standpipe of a tank for assembling, the float rod and carrier being in the vertically alined position shown in Fig. 3, it is essential that the float rod and carrier be moved away from such alined position and brought to a position of operating relationship after it is within the tank, and this may be accomplished by means of a suitable spring 35, see Fig. 3, attached to the side plate 8 and located in the path of the connecting rod 23, movement of the spring 35 being limited by a suitable stop 36. Thus when the parts are being inserted through a standpipe in the alined position shown in Fig. 3, connecting rod 23 engages the spring 35, putting tension on the latter so that when the parts are within the tank and the float and float carrier released, the spring 35 acting upon the connecting rod 23 moves the latter until the float rod is in a predetermined position to be engaged and operated by liquid within the tank.

It is also important, when removing the assembly from a tank for servicing or repair, that provision be made for swinging the float rod and carrier to a vertically alined position to prevent breaking or damaging the parts, and this may be accomplished by providing a manual lifting element in the form of a finger portion 37, see Fig. 2, at the upper end of the slidable actuator 21, and extending laterally beyond the side plate 9 through a suitable slot in the same. With this arrangement, the head 3 and the rest of the assembly can be lifted from the standpipe sufficiently for the operator to grasp the finger portion 37, and by pulling upwardly on the latter, it is possible to swing the float rod and carrier until they are in a position of vertical alinement with the supporting frame, such positioning of the parts taking place before the carrier and float rod are moved into the standpipe, so as to prevent engagement with the tank or with the bottom of the standpipe as the parts are removed.

In some cases, it may be desirable to effect such positioning of the carrier and float rod automatically upon removal, and this can be accomplished by the construction illustrated in Fig. 7 in which the connecting rod 38 is provided with means in the form of a cam portion 39, which engages the side wall of the standpipe, as shown in Fig. 8, as the parts are removed, and thus moves the float rod and carrier to the vertically alined position. This arrangement is feasible where the side wall of the standpipe is so related to the cam portion 39 as to engage and effect movement thereof, and where this cannot be accomplished, the parts are moved to the vertically alined position by the manual operation previously described.

While the invention has been described with reference to the embodiment shown, it is not restricted to the structural details herein set forth, and this application is intended to cover such changes or departures as may come within the intent of the improvements and the scope of the following claims.

We claim:

1. In a liquid level gauge, the combination with a rotatable relatively short spiral driven member, of a reciprocatory relatively long slidable actuator extending downwardly from and operatively connected with the spiral member, a swingable float carrier, a float thereon at one side of the pivotal axis of the float carrier, and a connecting rod pivotally connected to said slidable actuator and to said float carrier on the other side of its pivotal axis.

2. In a liquid level gauge, the combination with a supporting frame including parallel spaced side plates, spacing members located between and attached to said side plates, a rotatable relatively short spiral driven member journalled in said frame at the upper end thereof, a reciprocatory relatively long slidable actuator guided in openings in said spacing members and extending downwardly from and operatively connected to said spiral member, a float carrier pivoted between said side plates, a float thereon at one side of the pivotal axis of the float carrier, and a connecting rod pivotally connected to said slidable actuator and to said float carrier on the other side of its pivotal axis.

3. In a liquid level gauge, the combination with a supporting frame including parallel spaced side plates, spacing members located between and attached to said side plates, a rotatable relatively short spiral driven member journalled in said frame at the upper end thereof, a reciprocatory relatively long slidable actuator guided in openings in said spacing members and extending downwardly from and operatively connected to said spiral member, a float carrier pivoted between said side plates, a float thereon at one side of the pivotal axis of the float carrier, a connecting rod pivotally associated with said float carrier on the other side of its pivotal axis and with the slidable actuator, and a finger portion carried by said slidable actuator and extending beyond one of said side plates laterally for manually moving the actuator and float carrier.

4. In a liquid level gauge, the combination with a supporting frame including parallel spaced side plates, spacing members located between and attached to said side plates, a relatively short rotatable spiral driven member journalled in said frame at the upper end thereof, a reciprocatory relatively long slidable actuator guided in openings in said spacing members and extending downwardly from and operatively connected to said driven member, a float carrier pivoted between said side plates, a float thereon at one side of the pivotal axis of the float carrier, and a connecting rod pivotally connected to said slidable actuator and to said float carrier on the other side of its pivotal axis, said connecting rod including a cam portion for engagement with the wall of a standpipe to effect movement of the float carrier when moving the parts through the standpipe.

5. In a liquid level gauge, the combination with an indicator head and a supporting frame including parallel spaced side plates attached to said head, of a rotatable relatively short spiral driven member journalled in said supporting frame at the upper end thereof and adapted to be connected to a rotatable magnet frame in said indicator head, a reciprocatory relatively long slidable actuator mounted in said supporting frame and extending downwardly from and operatively connected to said spiral member, a float carrier pivotally mounted in said supporting frame, a float thereon at one side of the pivotal axis of the float carrier, and a connecting rod pivotally connected to said slidable actuator and to said float carrier on the other side of its pivotal axis.

6. In a liquid level gauge, the combination with an indicator head and a magnet frame mounted for oscillatory movement therein, of a supporting frame including parallel spaced side plates attached to said indicator head, an arbor carried by said magnet frame and extending through the bottom of the indicator head and into the upper portion of said supporting frame, a rotatable relatively short spiral driven member journalled in said supporting frame at the upper end thereof and having its upper end attached to said arbor of the magnet frame, a reciprocatory relatively long slidable actuator mounted in said supporting frame and extending downwardly from and operatively connected to said spiral member, a float carrier pivotally mounted in said supporting frame, a float thereon at one side of the pivotal axis of the float carrier, and a connecting rod pivotally connected to said slidable actuator and to said float carrier on the other side of its pivotal axis.

7. In a liquid level gauge, the combination with a supporting frame including parallel spaced side plates, of spacing and fastening means between said side plates including horizontal walls, a relatively short rotatable spiral driven member journalled on one of said horizontal walls in the supporting frame at the upper end thereof, a relatively long reciprocatory actuator slidably mounted in guiding openings in said horizontal walls and extending downwardly from and operatively connected to said spiral member, a float carrier pivoted between said plates of the supporting frame, a float thereon at one side of the pivotal axis of the float carrier, and a connecting rod pivotally connected to said slidable actuator and to said float carrier on the other side of its pivotal axis.

8. In a liquid level gauge, the combination with a supporting frame including parallel spaced side plates and an indicator head to which said frame is attached, of a relatively short rotatable spiral driven member journalled in the supporting frame at the upper end thereof, a relatively long reciprocatory slidable actuator mounted in the supporting frame and extending downwardly from and operatively associated with said spiral member, a float carrier and counterweight pivoted between the side plates of the supporting frame and adapted to be moved into alinement with said plates, a float thereon at one side of the pivotal axis of the float carrier, a connecting rod pivoted to said slidable actuator and to said float carrier at the opposite side of its pivotal axis, and manually engageable means carried by said actuator operable to move the actuator endwise to aline the float carrier and counterweight with the supporting frame.

9. In a liquid level gauge, the combination with a supporting frame including parallel spaced side plates and an indicator head to which said frame is attached, of a relatively short rotatable spiral driven member journalled in the supporting frame at the upper end thereof, a relatively long reciprocatory slidable actuator mounted in the supporting frame and extending downwardly from and operatively associated with said spiral member, a float carrier and counterweight pivoted between the side plates of the supporting frame and adapted to be moved into alinement with said plates, a float thereon at one side of the pivotal axis of the float carrier, and a connecting rod pivoted to said actuator and to said float carrier at the opposite side of its pivotal axis, said connecting rod including means engageable with the wall of a standpipe when the supporting frame is moved therethrough to actuate the float carrier and counterweight into a position alined with the supporting frame.

10. In a liquid level gauge, the combination with a supporting frame including parallel spaced side plates, of a relatively short rotatable spiral driven member journalled in said frame at the upper end thereof, a reciprocatory relatively long slidable actuator mounted in said frame and extending downwardly from and operatively connected with said spiral member, a float carrier and counterweight pivoted between said plates, a float thereon at one side of the pivotal axis of the float carrier, a connecting rod pivotally connected to said slidable actuator and to said float carrier on the other side of its pivotal axis, the connecting rod, float carrier and counterweight being movable into alinement with and between the edges of said plates of the supporting frame, and spring means carried by the supporting frame and engageable with said connecting rod to move the latter and the float carrier away from said alined position.

11. In a liquid level gauge, the combination with a supporting frame including parallel spaced side plates, of a relatively short rotatable spiral driven member journalled in said supporting frame at the upper end thereof, a reciprocatory relatively long slidable actuator mounted in said supporting frame and extending downwardly from and operatively connected to said spiral member, a float carrier comprising a plate pivoted between said plates of the supporting frame, a float thereon at one side of the pivotal axis of said plate, a connecting rod pivotally connected to said slidable actuator and to said float carrier on the other side of its pivotal axis, an elongated narrow counterweight secured to one end of said pivoted plate, and a float rod connected to the other end of said pivoted plate, said pivoted plate and counterweight being movable into alinement with the side plates of the supporting frame and positionable between the side edges of the same.

12. In a liquid level gauge, the combination with a supporting frame including parallel spaced side plates, of a rotatable relatively short spiral driven member journalled in said supporting frame at the upper end thereof, a reciprocatory relatively long slidable actuator mounted in said supporting frame and extending downwardly from and operatively connected to said spiral member, a float carrier comprising a plate pivoted between said plates of the supporting frame, a float thereon at one side of the pivotal axis of said plate, a connecting rod pivotally connected to said slidable actuator and to said float carrier on the other side of its pivotal axis, the opposite end of said pivoted plate being provided with a groove affording a seat, a float rod positioned in said seat and interlocked therewith against relative endwise or turning movement, and a fastening member slidably engaging the edges of said pivoted plate and the adjacent surface of the float rod and acting to hold the float rod on the pivoted plate.

13. In a liquid level gauge, the combination with a relatively elongated supporting frame, of a rotatable relatively short spiral driven member at the upper end of said supporting frame adapted to be connected to indicator mechanism, a float carrier pivoted at the lower end of the supporting frame, a float thereon at one side of the pivotal axis of the float carrier, operating instrumentalities connecting said float carrier at the opposite side of its pivotal axis with said driven member and acting to rotate the latter, said float carrier comprising a plate having a groove therein affording a seat, a float rod positioned in said seat, interlocking means between the float rod and plate to prevent relative turning or endwise movement of the float rod, and a slidable attaching member embracing the opposite edges of the plate and engaging the adjacent surface of the float rod for holding the float rod on the plate.

14. In a liquid level gauge, the combination with an elongated supporting frame, of a relatively short rotatable spiral driven member journalled in the frame at the upper end thereof, a relatively long reciprocatory slidable actuator extending downwardly from and operatively connected with the spiral member, a float carrier pivotally mounted at the lower end of the supporting frame, a float thereon at one side of the pivotal axis of the float carrier, and a connecting rod pivotally connected to said slidable actuator and to said float carrier on the other side of its pivotal axis.

15. In a liquid level gauge, the combination with a supporting frame, of a rotatable relatively short spiral driven member journalled in said frame at the upper end thereof, a reciprocatory relatively long slidable actuator mounted in the frame and extending downwardly from and operatively connected to said spiral member, a float carrier pivoted in the frame, a float thereon at one side of the pivotal axis of the float carrier, a connecting rod pivotally connected to said slidable actuator and to said float carrier on the other side of its pivotal axis, and a finger portion carried by the slidable actuator and extending laterally beyond said frame for manually moving the actuator and float carrier.

16. In a liquid level gauge, the combination with a supporting frame, of a rotatable relatively short spiral driven member journalled in said frame at the upper end thereof, a reciprocatory relatively long slidable actuator extending downwardly from and operatively connected to said driven member, a float carrier pivoted in the frame, a float thereon at one side of the pivotal axis of the float carrier, and a connecting rod pivotally connected to said slidable actuator and to said float carrier on the other side of its pivotal axis, said connecting rod including a cam portion for engagement with the wall of a standpipe to effect movement of the float carrier when removing the parts through the standpipe.

17. In a liquid level gauge, the combination with a supporting frame including parallel spaced side plates, of U-shaped spacing and fastening members between said side plates, each of said members including a horizontal wall between the side plates and terminating in vertical walls including reduced portions extending through openings in said plates and overlying the outer surfaces of the plates, a relatively short rotatable spiral driven member journalled on one of said horizontal walls at the upper end of the supporting frame, a relatively long reciprocatory actuator slidably mounted in guiding openings in said horizontal walls and extending downwardly from and operatively connected to said spiral member, a float carrier pivoted between said plates of the supporting frame, a float thereon at one side of the pivotal axis of the float carrier, and a connecting rod pivotally connected to said slidable actuator and to said float carrier on the other side of its pivotal axis.

18. In a liquid level gauge, the combination with a supporting frame including parallel spaced side plates, of U-shaped spacing and fastening members between said side plates, each of said members including a horizontal wall between the side plates and terminating in vertical walls including reduced portions extending through openings in said plates and overlying the outer surfaces of the plates, a rotatable relatively short spiral driven member journalled on one of said horizontal walls at the upper end of the supporting frame, a reciprocatory relatively long actuator slidably mounted in guiding openings in said horizontal walls and extending downwardly from and operatively connected to said spiral member, a float carrier pivoted between said plates of the supporting frame, a float thereon at one side of the pivotal axis of the float carrier, and a connecting rod pivotally connected to said slidable actuator and to said float carrier on the other side of its pivotal axis.

WILLIAM B. CONNOLLY.
WARREN W. HASTINGS.
WILLIAM MULCAHY.
GEORGE E. FORD.